United States Patent [19]

Gur

[11] Patent Number: 4,641,182
[45] Date of Patent: Feb. 3, 1987

[54] SYSTEMS AND COMPONENTS FOR DETECTING ELECTROMAGNETIC RADIATION AND DISPLAYING IMAGES PRODUCED THEREBY

[75] Inventor: Yehoshua Gur, Jerusalem, Israel

[73] Assignee: Gur Optics and Systems, Ltd., Jerusalem, Israel

[21] Appl. No.: 624,845

[22] Filed: Jun. 26, 1984

[30] Foreign Application Priority Data

Jun. 26, 1983 [IL] Israel ......................................... 69074

[51] Int. Cl.$^4$ ............................................. H04N 5/225
[52] U.S. Cl. ..................................... 358/41; 358/209; 358/113; 358/230
[58] Field of Search .................... 358/199, 209, 53, 41, 358/63, 56, 1, 230, 113, 111; 340/755; 378/146

[56] References Cited

U.S. PATENT DOCUMENTS

| | | | |
|---|---|---|---|
| 3,323,126 | 5/1967 | Malone et al. ..................... | 358/88 X |
| 3,662,368 | 5/1972 | Farnsworth et al. ................ | 340/204 |
| 3,786,269 | 1/1974 | Cooper ................................ | 250/334 |
| 3,922,654 | 11/1975 | Hobson, Jr. ....................... | 340/201 P |
| 3,958,235 | 5/1976 | Duffy ................................. | 340/336 |
| 4,095,257 | 6/1978 | Back .................................. | 358/113 |
| 4,335,307 | 6/1982 | DeVries et al. ..................... | 250/322 |
| 4,338,627 | 7/1982 | Stapleton ............................ | 358/113 |
| 4,398,302 | 8/1983 | Pfeiler ................................ | 378/146 |
| 4,404,591 | 9/1983 | Bonar ................................. | 358/111 |
| 4,539,589 | 9/1985 | Lindner et al. ..................... | 358/113 |

FOREIGN PATENT DOCUMENTS

| | | | |
|---|---|---|---|
| 1762104 | 4/1968 | Fed. Rep. of Germany ...... | 358/111 |
| 2087189 | 5/1982 | United Kingdom . | |

Primary Examiner—Michael A. Masinick
Attorney, Agent, or Firm—Sughrue, Mion, Zinn, Macpeak & Seas

[57] ABSTRACT

There is provided a system for detecting electromagnetic radiation and displaying images produced thereby. The system comprises an imaging device in a first housing, a first rotatable base element carrying an array of input elements which, when rotating together with this base define a surface on which the image is disposed. Rotation of the base element causes the input elements to scan the image, each scanned image point being converted into a video signal which, via a transmission and coupling device is fed to an image recorder and/or display. The system further comprises a second rotatable base element mounted in a second housing and carrying an array of output elements receiving, via a transmission and coupling device, the video signals from the input elements. The rotating output elements which are adapted to convert these video signals into light signals, create the impression of a continuous output image.

26 Claims, 22 Drawing Figures

SYSTEMS AND COMPONENTS FOR DETECTING ELECTROMAGNETIC RADIATION AND DISPLAYING IMAGES PRODUCED THEREBY

BACKGROUND OF THE INVENTION

The present invention relates to a system for detecting electromagnetic radiation and displaying images produced by such radiation, as well as to components of such a system.

SUMMARY OF THE INVENTION

More particularly the present invention relates to a camera for detecting, and a display unit for displaying, such images, and systems utilizing such cameras and such display units.

The term "electromagnetic radiation" as used hereinbelow is intended to include the entire visible spectrum of light, the IR and UV ranges as well as ionizing radiation such as X-rays.

In one aspect of the present invention, there is provided a camera for detecting electromagnetic radiation comprising:

a housing;

imaging means associated with said housing to provide an image of an object;

a base element rotatably mounted inside said housing in substantial coaxiality with said imaging means;

at least one array of mutually spaced input elements located on, and rotatable together with, said base element, said input elements, when rotating, collectively defining an image surface onto which surface said image is disposed;

means for imparting to said base element a continuous rotary movement whereby said array of input elements rotating together with said base element is made to scan image points of said image, each scanned image point being converted into a video signal, and a plurality of video signal transmission means leading via coupling means to at least one output terminal for connection to image recording and/or displaying means.

In one preferred embodiment of such a camera there is provided a TV-camera, in particular a TV-camera for closed-circuit television. Such cameras, which today are mostly based on the Vidicon type vacuum tube, are about 10 times as long as they are wide, because of the shape of this picture tube. Also, their resolution is rather low, being at most 500 lines/inch. More recently TV-cameras have been developed, based on "Charge-Coupled Devices" (CCD). These cameras, while more compact, are also more expensive, because of the huge numbers of CCD's required for superior resolution. To resolve, e.g., 2000 lines/inch would require $2000 \times 2000 = 4$ million CCD elements, hereinafter "CCD's", all of which would have to have the same characteristics. Not only is this far beyond the present state of the art (which does not exceed 300 lines/inch), but even with their present 90,000 CCD's, these cameras are very expensive. Color TV-cameras require three Vidicon tubes as well as a complex beam splitting system, making these cameras far more expensive than black-and-white cameras.

It is one of the objectives of the present invention to overcome the difficulties of the prior-art cameras and to provide a TV-camera that, exclusive of the lens system, can have a length, in direction of the optical axis, of about 5 cm; that provides a resolution unequaled by conventional cameras, while being drastically cheaper than these; and that has a color capability at a price not substantially higher than that of the black-and-white model.

This the invention achieves by providing a TV-camera comprising:

a housing;

optical imaging means attachable to said housing to provide an optical image of an object;

a base element rotatably mounted in said housing in substantial coaxiality with said optical imaging means;

at least one array of mutually spaced input elements located on, and rotatable together with, said base element, said input elements, when rotating, collectively defining an image surface onto which said imaging means is focussable;

means for imparting to said base element a continuous rotary movement, whereby said array of input elements, rotating together with said base element, is made to scan picture points of said optical image, each scanned picture point being converted into a video signal, and a plurality of video signal transmission means leading via coupling means to at least one output terminal for connection to image-recording and/or displaying means.

The camera according to the present invention is particularly suitable for use in closed-circuit television in conjunction with a novel, flat TV-display unit, described hereinbelow, which is directly connectable to the camera according to the present invention, or can be operated independently thereof as described hereinbelow.

In another embodiment of the present invention there is provided a camera for detecting X-rays.

More particularly according to the present invention, there is provided a camera for detecting X-rays, comprising:

a housing;

a base element rotatably mounted inside said housing;

imaging means to provide an X-ray image of an object, rotatably mounted at a distance from said base element and in substantial coaxiality therewith;

at least one array of mutually spaced input elements located on, and rotatable together with, said base element, said input elements, when rotating, collectively defining an image surface onto which surface said image is disposed;

means for imparting to said base element a continuous rotary movement, whereby said array of input elements rotating together with said base element is made to scan image points of said image, each scanned image point being converted into a video signal;

means for imparting to said imaging means a continuous rotary movement in synchronism and phase with said input elements when rotating, and a plurality of video signal transmission means leading via coupling means to at least one output terminal for connection to image recording, storing, and/or displaying means.

Conventional x-ray radiology employs photographic film to obtain and store the image. The use of film is expensive (approximately $400,000/hospital/year), has limited resolution and involves relatively high radiation doses to the patient. The use of film can be eliminated by digital systems, such as the digital subtraction angiography systems which are in fact modified CT scanners. These systems suffer from a trade-off problem between resolution and video rate, making it impossible to obtain high-resolution real-time radiographic images.

The present invention offers all the inherent advantages of a digital system, namely the elimination of use of film and the possibility of image processing and enhancement, as well as a higher dynamic range. It is also superior to existing digital radiology systems, having inherently higher resolution, with no need for a trade off in the video rate; using multi-spectral exposure with a much higher information content and, in addition, being much cheaper than the other systems.

In yet another aspect of the present invention there is provided a display unit comprising:

a housing;

a base element rotatably mounted in said housing;

at least one input terminal for connecting to a source of video signals;

at least one array of mutually spaced output elements located on, and rotatable together with, said base element;

a plurality of signal transmission means feeding said signals via coupling means from said input terminal to said array of output elements;

means for imparting to said base element a continuous rotary movement, whereby said input elements, adapted to convert said video signals into light signal, rotating together with said base element and responding to said signals, create the impression of a continuous output image.

This display unit can be used for displaying images generated by the above-described TV-camera, the above described X-ray camera or for other uses as described hereinbelow.

Today's display units are based on the cathode-ray tube (CRT), and while at least for general and entertainment purposes the picture quality both in black-and-white and in color as obtainable with the CRT is satisfactory, the latter suffers from an overriding disadvantage: its length which even with magnetic deflection is at least as great as the screen diameter, and with electrostatic deflection, even greater. This is the main cause for the bulkiness of TV-receivers, and the search for the "flat tube", in full swing for the last decade, has yet to come up with a satisfactory solution viable also beyond the confines of the laboratory.

It is one of the objectives of the present invention to overcome this drawback of the prior-art device and to provide a high-resolution black-and-white or color display unit that is truly "flat", e.g., capable of having a thickness of 3-5 cm only, yet using only proven, reliable available component technology and thus being relatively inexpensive.

This is achieved in the display unit of the present invention as described in greater detail hereinafter.

The present invention also provides a system for detecting electromagnetic radiation and displaying images produced thereby, comprising a camera unit for detecting electromagnetic radiation, comprising a first housing;

imaging means associated with said first housing to provide an image of an object;

a first base element rotatably mounted inside said first housing in substantial coaxiality with said imaging means;

at least one first array of mutually spaced input elements located on, and rotatable together with, said first base element, said input elements, when rotating, collectively defining an image surface onto which surface said image is disposed;

means for imparting to said first base element a continuous rotary movement whereby said first array of input elements rotating together with said first base element is made to scan image points of said image, each scanned image point being converted into a video signal;

a plurality of video signal transmission means leading via coupling means to at least one output terminal for connection to image recording and/or displaying means; and further comprising a display unit for displaying images produced by said radiation, comprising:

a second housing;

a second base element rotatably mounted in said second housing;

at least one input terminal for connecting to a source of video signals;

at least one second array of mutually spaced output elements located on, and rotatable together with, said second base element;

a plurality of signal transmission means feeding said signals via coupling means from said input terminal to said array of output elements;

means for imparting to said second base element a continuous rotary movement, whereby said input elements. adapted to convert said video signals into light signal, rotating together with said base element and responding to said signals, create the impression of a continuous output image, and connecting means for connecting said output terminal to said input terminal.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the system and its components in more detail than is necessary for a fundamental understanding of the invention, the description taken with the drawings making apparent to those skilled in the art how the several forms of the invention may be embodied in practice.

Figure 1:
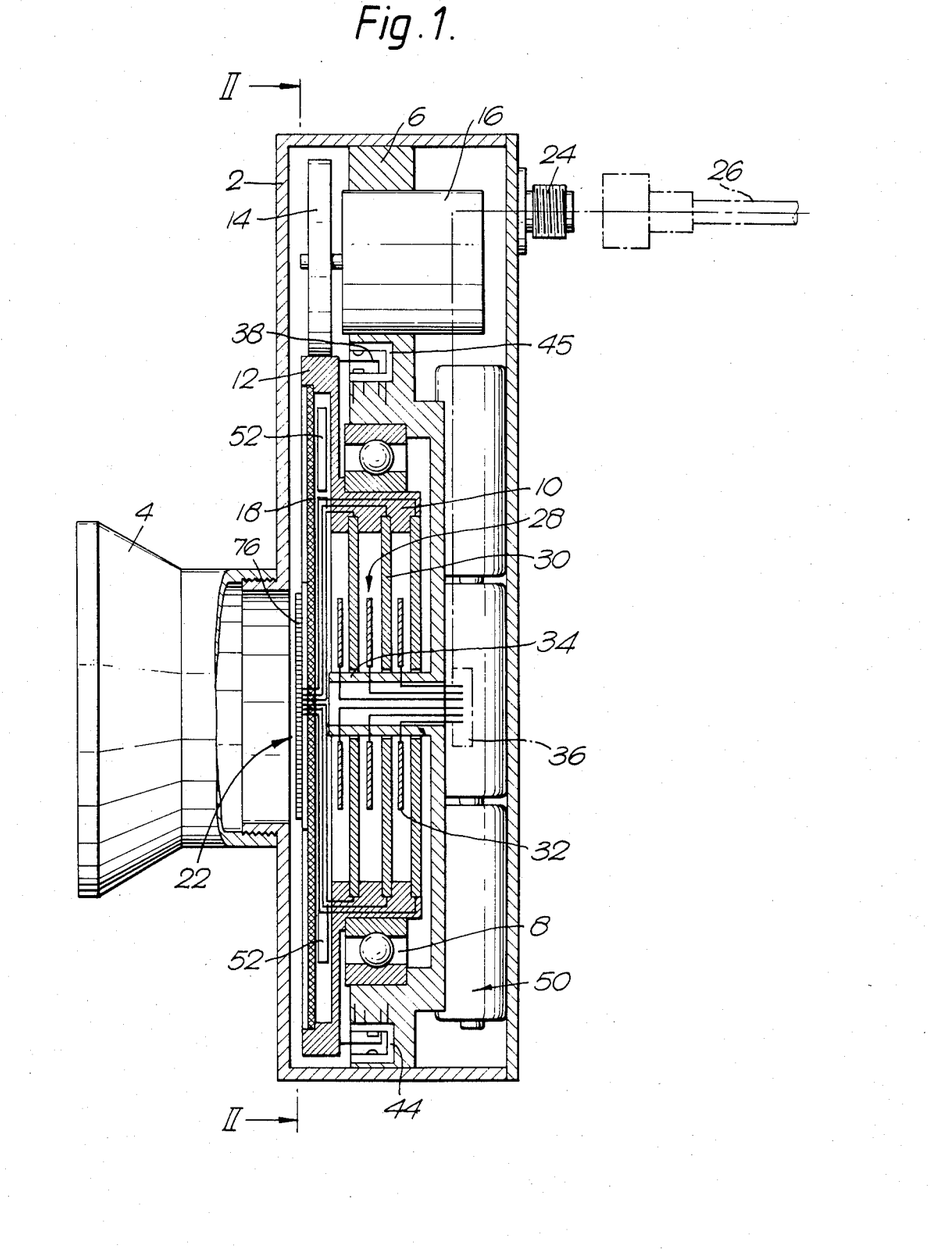
FIG. 1 is a side view, in cross section along plane I—I of FIG. 2, of a first embodiment of the camera according to the invention.
Figures 2, 3, 5, 6, 7:
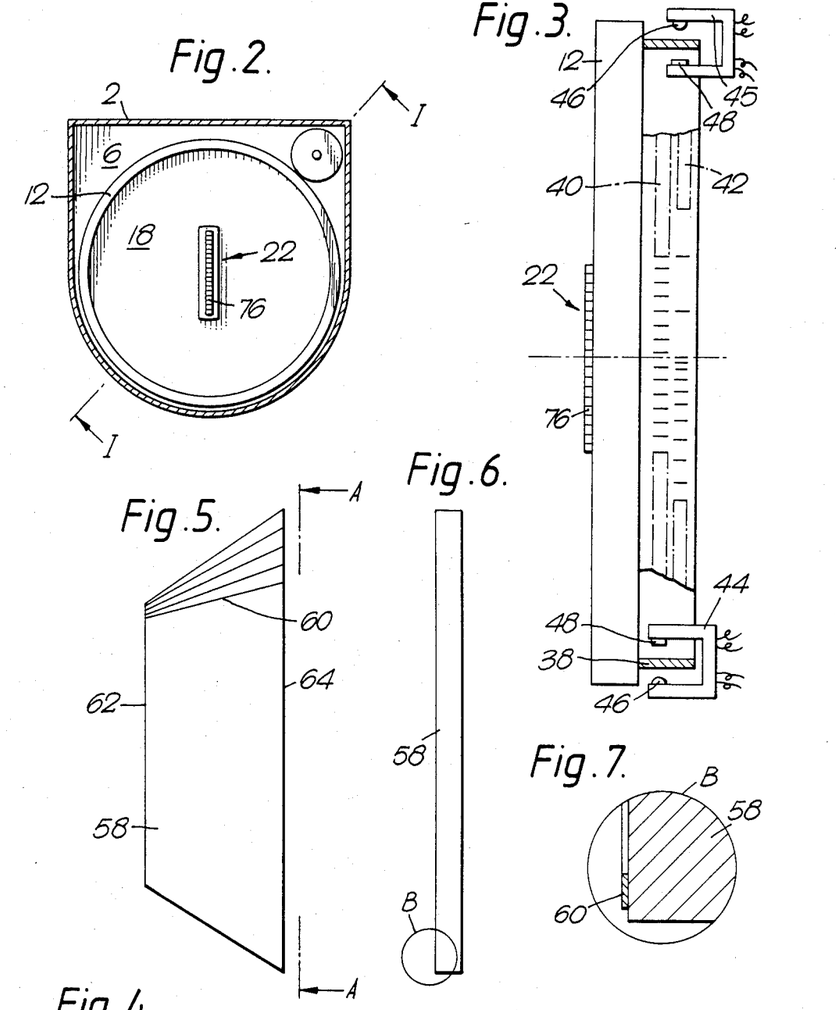
FIG. 2 is a front view, to a reduced scale, in cross section along plane II—II of FIG. 1, of the camera shown in FIG. 1.
FIG. 3 is a side view, in partial cross section, of the optical encoder controlling the rotary speed of the display means.
FIG. 5 is a side view of an optical wave guide.
FIG. 6 is a view, in direction of arrows A, of the wave guide of FIG. 5.
FIGS. 7, 8 and 9 represent different ways, in enlarged detail, of producing the optical wave guide of FIG. 5.

Referring now to the drawings, there is seen in FIGS. 1 (enlarged scale) and 2 (reduced scale) a housing 2, to which is attachable an optical imaging system 4, such as a photographic objective of the conventional type. Inside the housing 2 there is provided a partition 6 in which is fixedly mounted, in coaxiality with the objective 4, the outer race of a ball bearing 8, to the inner ring of which is attached the hub 10 of a disk-like base element 12. This base element can be rotated by means of a friction drive comprising a friction wheel 14 mounted on the shaft of an electric motor 16. The motor 16 is mounted on the partition 6, its mounting (not shown) including an elastic member biasing the motor 16 and the friction wheel 14 against the rim of the base element 12, to provide the necessary contact pressure. The friction drive used in the present embodiment is obviously only one of the possibilities to cause the base element 12 to rotate. Other possibilities are a belt drive or a motor in direct axial connection with the base element 12.

The front face of the base element 12 is recessed, the recess being covered with a printed-circuit card 18, the underside of which carries part of the electronic circuitry which will be explained in greater detail further below. On the upper side of the card 18 is mounted an array 22 of light-sensitive input elements 76. In this particular embodiment, these elements 76 are CCD's (charge-coupled devices) that, upon being hit by light rays, produce a voltage that is proportional to the intensity of these rays. The linear array 22 formed by these CCD's comprises, in the present embodiment, 1024 elements 76 which, when rotating together with the base element 12, collectively define an image surface onto which the optical system 4 of the camera can be focused and where, consequently, an image of the object or objects to be "shot" by the camera is produced. Now, as the array 22 rotates, the input elements 76 are made to scan the picture elements or points of the optical image, each scanned point being converted into an electrical signal that, eventually, is to be reconverted into a light signal. This, of course, takes place in the display unit will be described in detail further below.

In the camera itself, the problem of leading the output of the rotating input elements 76 and their equally rotating electronics to the stationary multipin output terminal socket 24—into which can be plugged the cable 26 leading to the display unit—is solved by means of a coupler in the form of a slip ring device 28 which, in this embodiment, has 16 information channels. The device consists of a set of rings 30 attached to, and rotating together with, the hub 10 of the base element 12, being electrically insulated from the base element as well as from one another, and of a set of stationary brushes 32 mounted on a common holder 34 attached to the partition 6. The brushes 32, too, are electrically insulated from other components of the camera as well as from one another. The 16-channel slip ring used in the present embodiment is of a commercially available type and need not, therefore be described in greater detail. Via a connector 36, the leads from the stationary part of the slip ring 28 are led to the output terminal 24.

It should be realized that other commercially available slip rings, such as those using an optical-fiber/LED's/photodetector combination can also be used.

To fully explain the operation of the camera according to the invention and, in particular, that of its electronics, a brief, preliminary description shall now be given of the display unit already mentioned.

The mechanical design of the display unit is similar to that of the camera, except for the absence of the lens system 4 and for its size, which is much larger, to provide a picture of sufficient size. There are also provided a base element rotated by an electric motor and a slip ring device electrically connecting the rotating elements of the unit with its stationary elements. The housing in front of the base element is open, to provide visual access to the face of the base element, on which is mounted an array of output elements, a perfect homologue to the array of input elements, only larger in size, i.e., with the distance between adjacent elements increased. These output elements are of the kind that emit light in proportion to a voltage applied to them. Such elements would be, for instance, LED's (light-emitting diodes), or any other light-emitting, transmitting or reflecting devices such as liquid crystal devices (LCD's), gas-discharge devices or fluorescent devices. By means to be discussed further below, the base element and array of the display unit are made to rotate not only in synchronism with the base element and array of the camera, but also at the same orientation, i.e., when the camera array is, e.g., in the vertical position, so is the display array. Now since (via electronics, slip rings, cable, etc.) each input element of the input array is in principle connected to its corresponding output element in the output array, every time an input element is stimulated by light passing the lens system, the voltage produced causes the corresponding output element to light up. When now both arrays are rotating, the output elements, lighting up in response to the input elements "scanning" the optical image, will create in the viewer the impression of a continuous, visually satisfying output image. This is of course due to the relative sluggishness of the mechanism of human visual perception which produces the impression of a simultaneity of image points where there is in fact a sequenciality.

From the above it is clear that means must be provided to ensure (1) perfect synchronism between the base element and photodetector array of the camera and the base element and LED array of the display; (2) a specific phase relationship between these two synchronous rotary movements, to ensure that verticals in the object also appear as verticals in the image of the display unit. This relationship is a constant phase difference of 180°, which allows for the fact that the optical image scanned by the input array is upside down, while the output image must be right side up.

To ensure these two conditions, there is provided, in both the camera and the display unit, an optical encoder, which is best understood from FIG. 3, in which is seen the base element 12 and the input array 22. Attached to the base element 12 is a ring 38 made of a transparent material such as plexiglas or the like. On its peripheral surface, the ring 38 carries two axially offset scales: a linear scale 40 in which the scale markings are equidistant, and a non-linear scale 42 in which the interval between the markings gradually increases from a minimum to a maximum. Scales 40, 42 are scanned by scanning heads 44 and 45 respectively, each comprising a light source 46 and a photodetector 48. When, together with the base element 12 and the array 22, the ring 38 rotates, the scale markings, passing across the light path between the respective light sources 46 and detectors 48, modulate the light flux reaching the detectors, producing in them voltages that fluctuate as a function of tne scale intervals and the speed of rotation of the ring 12. The head 44, scanning the linear scale 40, produces a D.C. that fluctuates at a constant frequency (assuming the base element 12 to rotate at a constant speed), while the head 45, scanning the non-linear scale 42, produces a D.C. that fluctuates at a frequency varying between a minimum and a maximum value, its instantaneous value depending on the instantaneous angular position of the base element. As already mentioned, the display unit is equipped with an identical encoder. The electronics associated with the encoders include a first comparator that compares the frequencies produced by the scanning heads 44 which control synchronism, and a second comparator that compares the instantaneous values of the frequencies produced by the heads 45 which control orientation or phase. Any differences, if established, are converted into changes in the voltage feeding the servo motor of the display unit which is either accelerated or decelerated so that synchronism and the above-mentioned 180° phase difference are achieved and maintained.

While the scanning heads shown work on transmitted light, i.e., light that is modulated by passing through the ring in which transparent portions alternate with opaque portions, an arrangement is also possible in which the encoder works on reflected light, i.e., light from the source 46 is alternatingly reflected from, and absorbed by, bright and dark portions that make up the two scales 40 and 42 provided, in this case, on an opaque background. The source 46 and the detector 48 are in this arrangement mounted in such a way that their axes would correspond to the angle-of-incidence/angle-of-reflection relationship.

The camera can be powered from the mains via a suitable power pack including a transformer/rectifier arrangement, or with the aid of batteries 50.

The task of the electronic processor units 52 mounted below the p.c. card 18 is to scan or address the 1024 CCD's in a certain order and to have the suitably amplified signals from these CCD's appear at the output terminal 24, whence they may be transmitted via the cable 26 to the already mentioned display device, where a similar arrangement of processors will distribute these signals each to its appropriate LED. (It is of course also possible to record these signals on tape, including the encoder signals, for storage and replay).

In principle, it would be possible to scan all 1024 CCD's in one sequence and pass the signals through a single channel. This, however, would entail the transmission of 1024 bits per angular position of the array, that is, given a reasonable rotational speed of the array, of about $10^7$ bits per second. While such high data transfer speeds are within the possibilities of the present state of the art, e.g., TTL (Transistor-Transistor Logic) or ECL (Emitter-Coupled Logic), current consumption of these devices is very high. It has therefore been decided to use CMOS (Complementary Metal Oxide Semiconductors) whose current consumption is significantly lower, even at the cost of a much lower speed. This lower speed of the CMOS devices, however, necessitates the provision of more than one channel, in the present embodiment, in fact, 16 channels. The array of 1024 input elements is divided into 16 groups of 64 elements each and at a given instant the voltages from the 16 first elements of each group of 64 elements are transferred in parallel via the slip ring 28 to the output terminal 26. Next, the voltages from the 16 second elements are transferred, then from the 16 third elements, and so forth.

Figure 4:
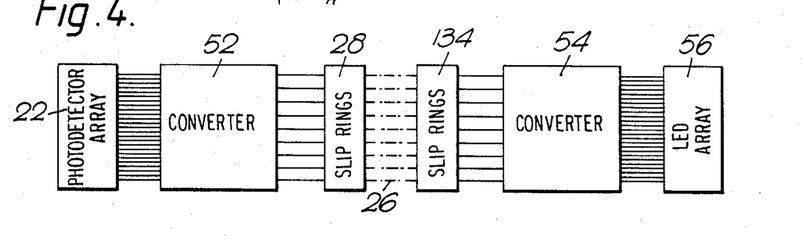
FIG. 4 is a block diagram of the electronics of the camera according to the invention.

FIG. 4 is a block diagram illustrating the above, showing the array of CCD's photodetectors 22, the signals from which are fed via N (=1024) channels to a converter 52 converting N parallel to M (=16) serial channels, leading to the slip ring 28 and from there to the cable 26 connecting the camera to the display unit, where via another slip ring 134, the signals are fed to a M channel serial to N channel parallel converter 54 and thence to the LED array 56.

While the presently discussed embodiment uses CCD's as photodetectors, the camera according to the present invention can use other types of photodetectors as well, which are much cheaper than the CCD's. Their disadvantage, however, is their size which is substantially larger than that of the CCD's. This disadvantage can be overcome by using thin optical fibers, the free ends of which are brought to the surface of the p.c. card 18, where they now constitute the input elements forming the array 22 which, due to the thinness of the fibers, can now be very closely spaced. The other ends of the fibers which, below the p.c. card 18, can fan out as much as required, are each attached to a photodetector, the size and group configuration of which is now immaterial.

Figures 8, 9, 10, 11:
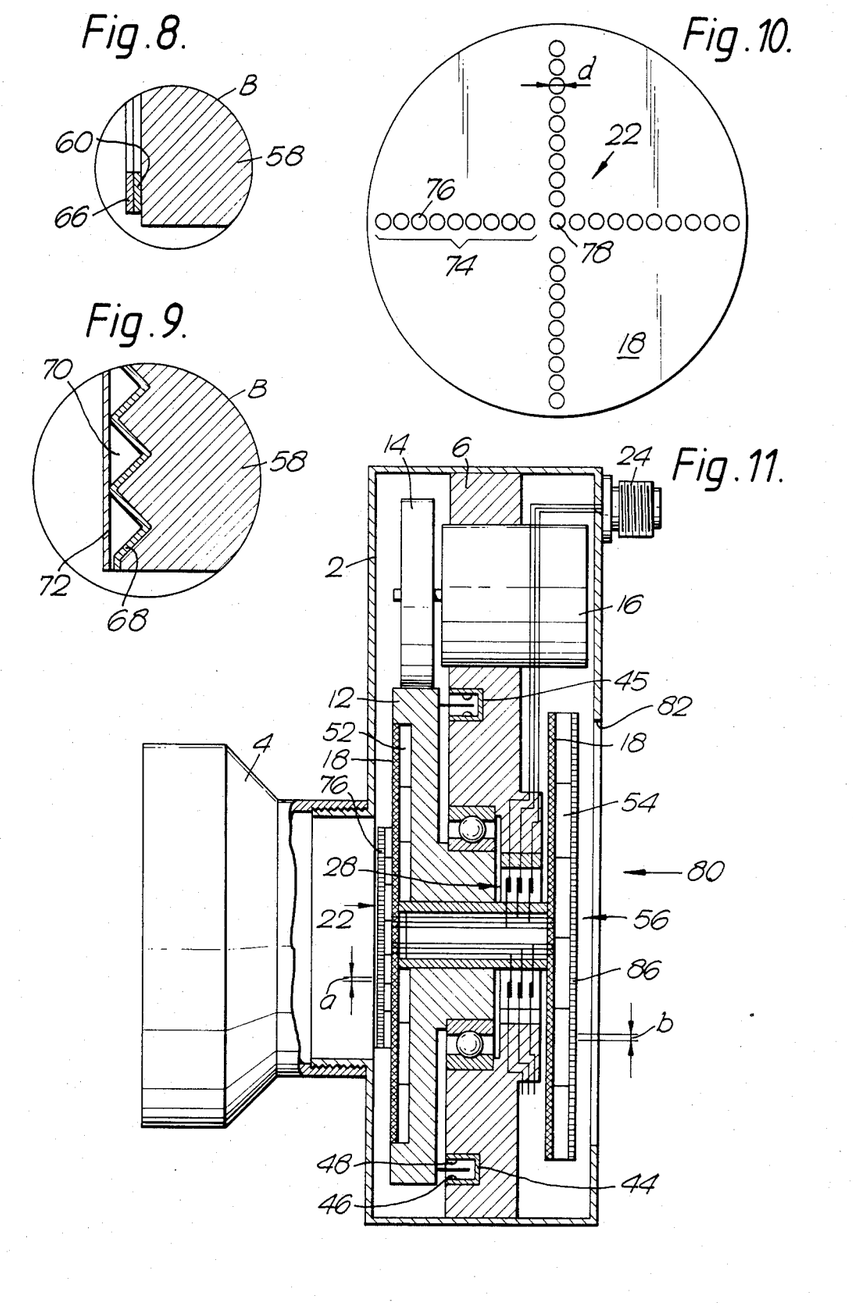
FIG. 10 is a schematic representation of a pattern of an input-element array.
FIG. 11 shows another embodiment of the camera according to the invention, provided with a view finder.

Another way of "piping" the light from densely grouped pixels at the image surface to more widely spaced photodetectors located below the image surface is to use so-called "optical wave guides", shown in FIGS. 5 to 8. These devices consist of substrates 58 on which, by methods known from techniques used in the production of microelectronics components (such as diffusing, masking, etching, vacuum-depositing, etc.) there are provided very thin and narrow strips 60 of a transparent material in which, like in optical fibers, light can travel, while being confined to the strip due to total internal reflection. These strips 60 can be of any configuration, such as the fan-like configuration seen in FIG. 5, where on one edge, 62, of the substrate 58 they are very closely spaced and, in fact, can serve as the array 22, while at the other edge, 64, they are spread apart, providing sufficient room for optical contact with photodetectors. FIG. 6 is a side view of the substrate 58 of FIG. 5 as seen in direction of arrow A, and B is a detail greatly enlarged in FIGS. 7 to 9. The substrate 58 is usually glass or plexiglas and the strip 60 is of a material having a higher index of refraction than the substrate, a condition for total internal reflection to take place. FIG. 7 shows a simple strip 60, while in FIG. 8 the light-guiding strip 60 is covered by a reflective layer 66, totally eliminating any losses to the atmosphere. Yet another method of producing these light guides is illustrated in the detail of FIG. 9. Here grooves of a triangular cross section are scribed on the substrate, using a diamond tool. The bottom of these grooves is provided with a reflective coating 68, the grooves are filled with a transparent material 70, which is then covered with a second reflective coating 72. Light will travel in the guides 70 produced in this way, being confined by the reflective coatings 68 and 72.

Resolution of the camera is obviously a function of the number of input elements, that is, photodetectors, per unit length of the image diameter. Hence the advantage of the CCD's, each element of which has an effective size of about 15$\mu$ only, or of the above-explained uses of fiber optics or optical wave guides. However, good resolution can also be obtained from ordinary photodetectors by using an array pattern comprised of several line arrays in, e.g., a star-like arrangement, or the cruciform shape shown in FIG. 10, and radially offsetting the separate line arrays 74 relative to one another by a radial distance equaling the diameter d of a single input element 76 divided by the number of line arrays to the array pattern, in this case four. This is clearly seen in FIG. 10, where the "3 o'clock" line array is contiguous with the central input element 78, the "12 o'clock" array is no longer touching the central element 78, and the "9 o'clock" and "6 o'clock" arrays move progressively farther away. Obviously the pattern of the output-element array in the display unit must be geometrically similar.

Another embodiment of the camera according to the invention is shown in FIG. 11. This embodiment is equipped with a viewfinder 80 at the rear of the camera, the housing 2 of which is for this purpose provided with a window 82. Mounted on another printed-circuit card 18, which is attached to a hollow shaft solid with the base element 12, there is provided an output-element array 56 geometrically similar to the input-element array 22. This output-element or LED array 56 is connected via the converter 54 to the input-element array 22, so that light from the optical system 4 falling onto the image surface defined by the array 22 will cause the LED's to light up, at an intensity corresponding to the intensity of the picture points or pixels scanned at any particular instant by the input array 22. Rotation of the base alement, as already explained, will cause the LED's to "paint" an image of the object "seen" by the optical system. It is seen from the drawing that the output array 56 is about twice as long than the input array 22. Since the number of output elements 86 is by definition equal to that of the input elements 76 (one-to-one correspondence), the optical image covering the input-element array 22 must also, as output image, cover the output-element array 56. One thus obtains a magnified image, the ratio of magnification being b/a, where a is the spacing of the input elements 76 and b, the spacing of the output elements 86.

To cause the upside-down optical image to become a rightside up output image, all that is required is to connect (counting the elements, say, from top to bottom) the first input element 76 to the last output element 86; the second input element to the last-but-one output element, and so on.

The slip ring 28 is connected to the input processors 52 in parallel with the output elements 76 and their processors and, as in the previous embodiment, leads to the output terminal 24.

The embodiments discussed so far produce black-and-white images. The present invention however, also permits the transmission of color images. In a first embodiment of such a camera, this is achieved in the following way: The input array 22, shown in FIG. 12, has three branches, each of them covered by a filter having one of the primary colors. Thus in FIG. 12 the "12 o'clock" branch is covered by a red filter R, the "4 o'clock" branch, by a green filter G, and the "8 o'clock" branch by a blue filter B. As each of these filters transmit only light of their own color, the R-branch of the input-element array 22 will be stimulated only by the red component of the image points scanned, the G-branch only by the green component, and the B-branch only by the blue component. The pattern of the output-element array 56 is of course similar to that of the input-element array 22, however, assuming the two arrays 22, 56 to be of identical orientation (which, in operation, they obviously are), the "12 o'clock" branch of the output array is made up of LED's producing red light, the "4 o'clock" branch, of LED's producing green light, and the "8 o'clock" branch, of LED's producing blue light. Now, as the electronic circuitry is arranged in such a way that signals from any branch of input elements will be fed only to the identically colored branch of output elements (R to R, G to G, B to B), it is clear that, upon rotation of both the input array 22 and the output array 56, the colored image, resolved by the filters R, G, B, of the input array, will be reconstituted by the colored LED's of the output branches R, G, B.

In another embodiment, illustrated in FIGS. 13 to 16, color transmission is achieved with one input-element array only, without the aid of filters.

Along the inside of the collar 88 (FIG. 13) onto which is screwed the optical system 4, there are mounted a number of red (i.e., red-light producing), green and blue LED's 90 in equal proportions in such a way that, when lit, they will illuminate the image surface S defined by the input-element array 22. To ensure uniformity of illumination independently of distance from the peripheral LED's 90, each LED is provided with a diffusing barrier 92 made of a translucent material and having a substantially triangular cross section (FIG. 15) due to which the diffusing barriers 93 discriminate against shorter distances to the image surface S, in favor of longer distances, as is clearly demonstrated in FIG. 15.

Figures 12, 13:
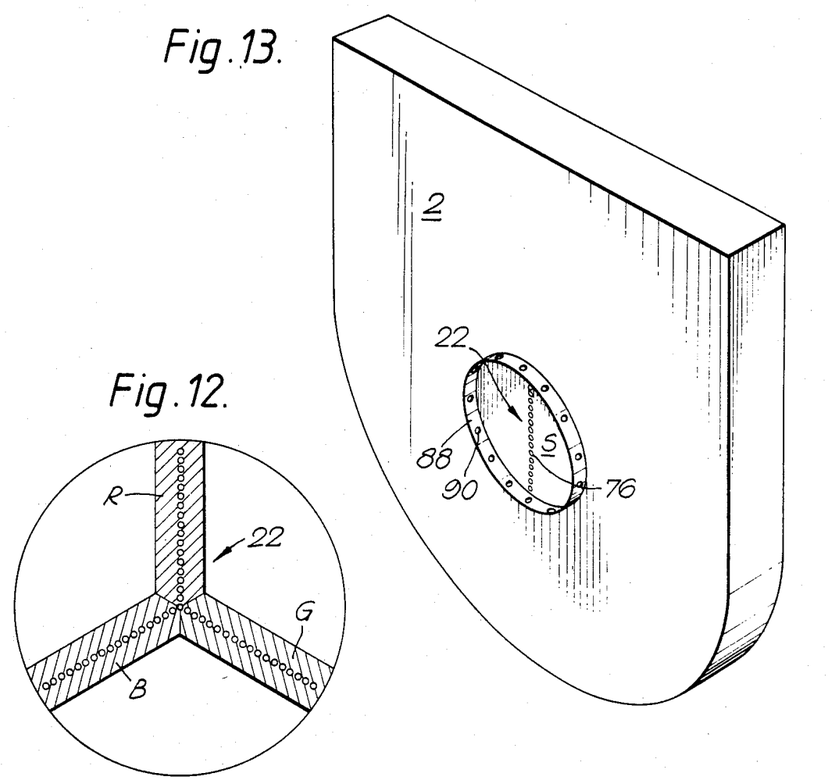
FIG. 12 represents a multi-branched input-element array suitable for color transmission.
FIG. 13 is a perspective view of an arrangement for color transmission using only a single-branched input-element array.
Figure 14:
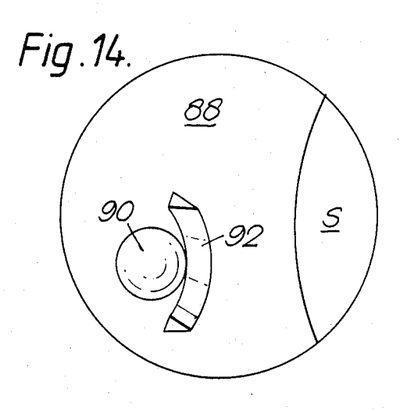
FIG. 14 shows, to an enlarged scale, a detail of the arrangement of FIG. 13.
Figure 15:
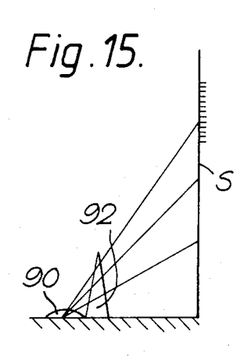
FIG. 15 is a schematic representation explaining the function of the diffusing barrier of FIG. 14.

Suppose now that, at a certain photodetector (denoted by Det) the light intensity produced by the object image as focused by the lens system is I. Suppose also the average intensity over the entire image plane to be $I_{av}$. If we now were to filter the light through a red filter, the intensity at Det would be $I_R$, and the average intensity $I_{Rav}$. Proceeding analogously for green (G)

and blue (B) (or green and yellow, if no blue LED should be available), it is possible to state $$I = I_R + I_G + I_B,$$

and $$I_{av} = I_{Rav} + I_{Gav} + I_{Bav}$$

If now the image surface S is illuminated in rapid succession by the colored LED's, one color at a time, the output of Det for instants 1, 2, 3 (which correspond to the instants of red, green and blue illumination) will be $$I_{Det1} = I_R + I_{Rav} + I_G + I_B$$

$$I_{Det2} = I_R + I_G + I_{Gav} + I_B$$

$$I_{Det3} = I_R + I_G + I_B + I_{Bav}$$

Figure 16:
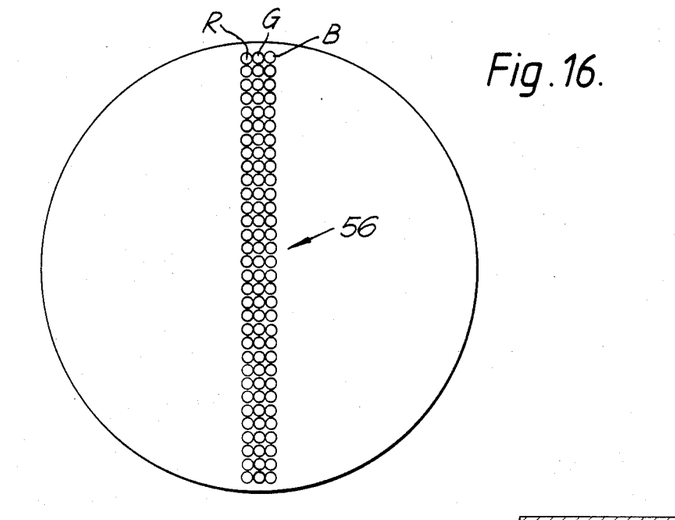
FIG. 16 is a general view, to reduced scale, of the output-element array in the display unit for use with the arrangement of FIG. 13.

$I_{Det1}$, $I_{Det2}$ and $I_{Det3}$ are transferred to an electronic circuit which very rapidly solves the three above equations and determines the unknowns $I_R$, $I_G$ and $I_B$. These signals are then transferred to the corresponding three LED's at the corresponding pixel of the display array. The observer thus perceives three luminous points within an area not larger than the resolving power of the human eye, the sum of colors of which points equals the color stimulating the photodetector Det. The shape of the output array 56 in the display unit is seen in FIG. 16, in which every input element 76 in the camera is associated with a "triad" comprising one red, one green and one blue LED.

Figure 17:
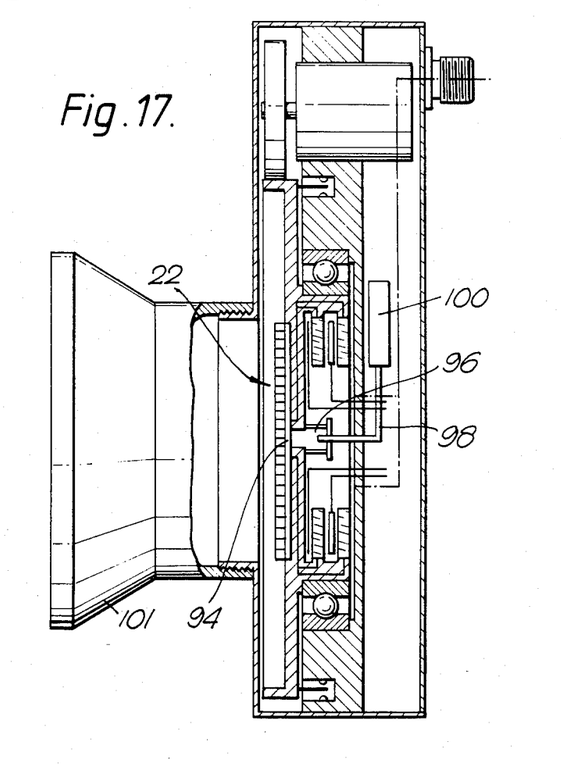
FIG. 17 shows an embodiment of the camera according to the invention, suitable for thermal imaging.

As already mentioned, the camera according to the invention is not limited to applications involving visible light only. Another embodiment of the camera according to the present invention which is sensitive to the infrared range of the spectrum and thus serves for thermal imaging is shown in FIG. 17. This embodiment is not much different from the visible-light camera described earlier, except in two details: the optical system 4 must be IR - transmissive, the detectors must be IR-sensitive and provision must be made for continuous cooling of these detectors. IR-optics are available, as are IR-detectors. The last condition is met by providing a channel 94, extending below and along the entire array 22 and containing a coolant supplied via a rotary seal 96 through a stationary tube 98 from a coolant reservoir 100.

Yet another embodiment of the camera according to the invention is usable for X-ray radiography.

Figure 18:
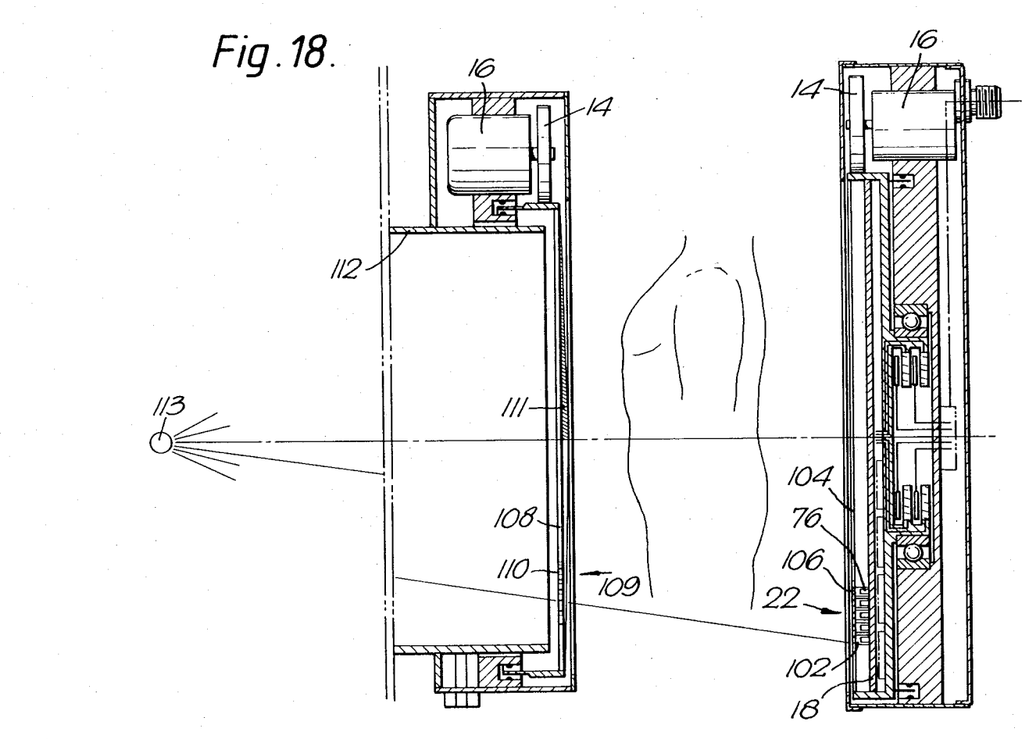
FIG. 18 is a schematic representation of a camera according to the invention, suitable for radiography.

As in previous embodiments, the p.c. card 18 carries an array 22 of detectors which is preferably of the multibranched type and, for better resolution, may employ the earlier discussed radial offset principle. These can either be detectors of visible light of the type used in previous embodiments, in which case they are used in conjunction with scintillator crystals that emit visible light when absorbing X-rays, or else they are special solid-state diodes that produce a voltage when hit by X-rays, thus obviating the need for scintillator crystals. In the embodiment of FIG. 18 the input elements 76 are common photodetectors, sensitive to visible light, stimulated by the light emitted from scintillator crystals 102 as explained above. The entire array which, as before, rotates together with the base plate 12, is shielded by an X-ray-opaque plate 104 with a number of holes 106 equal to the number of detectors, each hole providing access to one detector only, the plate 104 protecting the detectors against scattered radiation.

Beyond an intervening space provided to accommodate the patient or the object to be X-rayed, there is mounted, in coaxiality with the axis of rotation of the base element 12, a rotatable, disk-like mask 108 in which there is provided an array 109 of holes 110 of a pattern geometrically similar to that of the input-element array 22 in the camera, being an affine transformation of the input-array pattern with respect to the source of X-rays assumed to be point-like. This mask 108 is in fact the imaging element of this embodiment, "painting" as it does an X-ray shadowgraph onto the image surface defined by the rotating input array 22. The mask 108 is made of an X-ray impermeable material such as lead and is rotated by means of a friction drive similar to that of the camera, comprising a friction wheel 14 and a motor 16. To compensate for the fall-off of delivered dosage towards the periphery of the mask 108, a disk-like filter 111 can be attached to the mask, which tapers from the center towards the periphery. Another method of compensation would be the addition of holes 110 towards the periphery and of corresponding detectors on the base plate 12. As the mask 108 can have no central bearing which would interfere with the X-ray flux, it is supported and guided at its periphery (in a manner as such known and not explained in detail) by at least two guide and support rollers that also provide the counter-force to the friction wheel 14 which, together with its motor 16, is spring-biased against the periphery of the mask 108, to provide the necessary contact pressure.

As the disk-like mask 108 must rotate both in synchronism and in phase with the base element 12 and its input-element array 22, it is provided with an optical encoder similar to that of the base element 12 and shown in FIG. 3, including the two-scale ring 38 and scanning heads 44 and 45. The assembly: mask 108/encoder/drive motor/guide and support rollers is attached to the shielded housing 112 of an X-ray source 113.

To reduce the X-ray dosage absorbed by the patient to a minimum, the camera system preferably works for one single full turn only and the output signals are stored in a computer memory. For non-destructive testing of materials and structures, exposure time need not, of course, be limited. For viewing the radiograph, the signals are retrieved from the computer and cycled through the display unit for as long as required.

Figure 19:
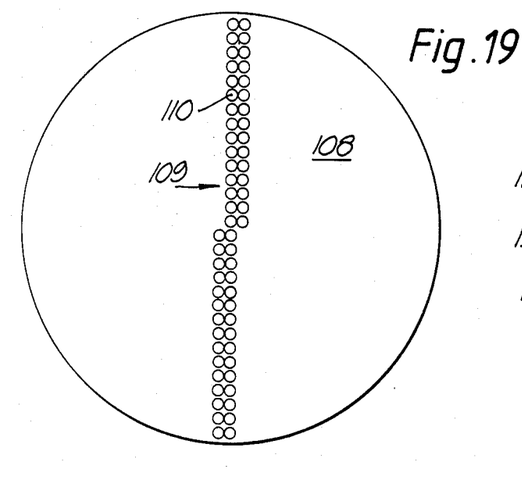
FIGS. 19 and 20, a front view and cross sectional view, respectively, show the disk-like mask of the camera of FIG. 18 as modified for use in electronically enhanced angiography.

For angiography, i.e., the roentgenographic visualization of blood vessels after injection of an X-ray-opaque substance, it is advantageous to use a mask configuration that facilitates electronic image enhancement by the per se known subtraction method in which the mask 108 is provided with an array 109 comprising two parallel, closely spaced rows of holes 110 (FIG. 19), with a corresponding double row of holes 106 and input elements 76 also on the base element 12. By electronically subtracting the signals from each pair of adjacent holes, a realtime spatial tangential derivative of the image is obtained. In a variant of the method, one row of the double row of holes 109 is covered with a filter 114 (FIG. 20) consisting of a strip of nickel or iron which passes a certain spectral range to the exclusion of another. Subtraction of the signals from each pair of adjacent holes gives a double-energy subtraction image. In some cases it may be advantageous to use two different filters, to cover both rows of the double row.

The general mode of operation of the display unit according to the invention has been discussed in conjunction with the explanations relating to the camera according to the invention. At this point it should be added that the display unit, quite apart from being a natural complementary to the camera, can also be used independently of the latter. As, due to its operating principle, this display unit is particularly suited, e.g., for signals in R, θ coordinates, it could profitably serve in radar systems. The radar scanner provides two signals, one being the θ-coordinate, provided by the synchro motor of the scanner and indicating the instantaneous angular position of the scanner, the other being a video signal in the form of an echo returned from the body hit by the radar beam. Both signals are compatible with the basic principle of the display unit according to the invention and radar data could easily be displayed by it, to better effect than by the rapidly fading image on the non-persistent CRT-screen. The display unit according to the invention is also computer compatible, merely needing a translator that converts signals in x, y coordinates into signals in R, θ coordinates. Microprocessors performing this task are commercially available.

Figure 21:
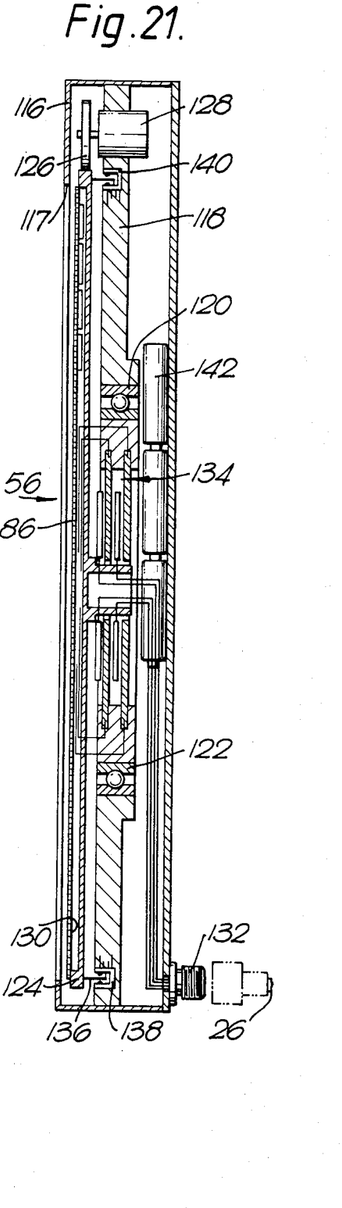
FIG. 21 is a side view, in cross section, of the display unit according to the invention.

In its physical design, illustrated in FIG. 21, the display unit, as already mentioned, has much in common with the camera according to the invention.

There is provided a housing 116 having on its front side a large window 117 through which the image generated can be viewed. Inside the housing 116 there is seen a partition 118 in which is fixedly mounted the outer race of a ball bearing 120, to the inner race of which is attached the hub 122 of a disk-like base element 124. This base element can be rotated by means of a friction drive comprising a friction wheel 126 mounted on the shaft of an electric motor 128. The motor 128 is mounted on the partition 118, its mounting including an elastic member (not shown) biasing the motor 128 and the friction wheel 126 against the rim of the base element 124, to provide the necessary contact pressure.

The front face of the base element 124 is recessed, the recess being covered with a p.c. card 130, the underside of which carries part of the electronics of the device. On the upper side of the card 130 is mounted an array 56 of output elements 86, a perfect homologue to the array 22 of input elements 76 of the camera, only larger in size, i.e., with the distance between adjacent elements increased. These output elements 86, as already mentioned, are of the kind that emit light in proportion to a voltage applied to them. Such elements would be, e.g., LED's (light-emitting diodes). The linear array 56 formed by these LED's comprises, in the present embodiment, 1024 elements 86 which, being connectable to a source of signals, be it the camera according to the invention or a computer memory, will light up and, in the manner explained hereinabove, produce an output image.

Signals are fed to the unit via the cable 26 and the input terminal 132 and the transition from the stationary part of the electrical connections is effected by means of the slip ring 134 which is of the same type, and has the same number of channels, as the slip ring 28 of the camera. Also provided, for the purpose already explained in conjunction with the camera, is the optical encoder illustrated in FIG. 3, including the scale ring 136 and the two heads 138, 140. Batteries 142 facilitate mains-independent operation.

Figures 20, 22:
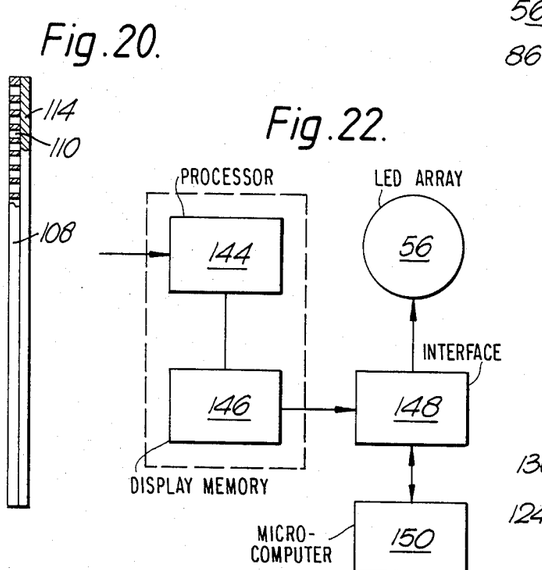
FIG. 22 is a block diagram of the electronics of the display unit, according to the invention.

The basic electronic circuit of the display unit has already been explained with reference to the right half of FIG. 4, where the cable 26 is seen to lead to the slip ring 134 and, via an M (=16) channel serial to an N (=1024) channel parallel converter 54, to the LED array 56. A more elaborate block diagram is shown in FIG. 22, where there is seen an optional unit for connection to a data and commands-supplying computer, comprising a processor 144, a display memory 146 (used, for instance, to repeat, ad libitum, the one-revolution image of the above-mentioned X-ray camera), an interface 148, into which are plugged either the above optional unit, or R, θ-type signals from external signal sources like radar, or the cable 26 from the camera according to the invention. Connectable to the interface 148 is also a microcomputer 150 for image processing and enhancement as mentioned in connection with the X-ray camera.

While at least some embodiments as described in the present specification are based on the conversion of light values into electrical signals, the transmission of these signals by electrical conductors, and the reconversion of these signals into light values, a system could be envisaged which uses direct transmission of these light values via optical-fiber conductors, employing optical slip rings which are already available today.

While particular embodiments of the invention have been described, it will be evident to those skilled in the art that the present invention may be embodied in other specific forms without departing from the essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A system for detecting electromagnetic radiation and displaying images produced thereby, comprising:
a first housing;
imaging means associated with said first housing to provide an image of an object;
a first base element rotatably mounted inside said first housing in substantial coaxiality with said imaging means;
at least one first array of mutually spaced input elements located on, and rotatable together with, said first base element, said input elements, when rotating, collectively defining an image surface onto which surface image is disposed;
means for imparting to said first base element a continuous rotary movement whereby said array of input elements rotating together with said first base element is made to scan image points of said image, each scanned image point being converted into a video signal;
a plurality of video signal transmission means leading through first converter means via coupling means to at least one output terminal for connection to image recording and/or displaying means, and further comprising:
a second housing;
a second base element rotatably mounted in said second housing;
at least one input terminal for connecting to a source of video signals;
at least one second array of mutually spaced output elements located on, and rotatable together with, said second base element;

a plurality of signal transmission means feeding said signals through second converter means via coupling means from said input terminal to said array of output elements;

means for imparting to said second base element a continuous rotary movement, whereby said output elements, adapted to convert said video signals into lights signals, rotating together with said base element and responding to said signals, create the impression of a continuous output image, and connecting means for connecting said output terminal to said input terminal, characterized in that:

said first and said second housing are positionally independent of one another, being connected via cable means attachable to said output terminal on the one hand and said input terminal on the other;

said first array comprises a plurality of N input elements and said first converter means is a parallel-to-serial converter comprising N input channels and M output channels;

said output terminal and said input terminal provide connection for M channels;

said second converter means is a serial-to-parallel converter comprising M input channels and N output channels, wherein N>>M; and further characterized in that the spacing of said output elements in said second array is larger than the spacing of said input elements in said first array, whereby said output image is rendered larger than the input image as provided by said imaging means.

2. The system as claimed in claim 1, wherein said video signals are electrical signals.

3. The system as claimed in claim 1, further comprising angular encoder means fixedly attached to, and rotatable with, said first and second base elements.

4. The system as claimed in claim 1, wherein said input elements are constituted by photodetectors.

5. The system as claimed in claim 1, wherein said input elements are constituted by the combination: optical fibers/photodetectors.

6. The system as claimed in claim 1, wherein said output elements are light-emitting diodes.

7. The system as claimed in claim 1, wherein said coupling means are mechanical slip ring devices comprising slip-ring and brush-type elements, one type of said elements being stationary relative to said base element, the other relative to said housing.

8. The system as claimed in claim 1, wherein the geometries of said first and said second arrays are similar.

9. The system as claimed in claim 1, wherein said first and second arrays are constituted by a single line array each.

10. The system as claimed in claim 1, wherein said first and second arrays are constituted by a pattern containing a plurality of line arrays.

11. The system as claimed in claim 10, wherein said first and second line arrays are radially offset relative to one another by a radial distance equaling the spacing of said input and output elements respectively, divided by the number of line arrays to said pattern.

12. A camera for detecting electromagnetic radiation, comprising:

a housing;

imaging means associated with said housing to provide an image of an object;

a base element rotatably mounted inside said housing in substantial coaxiality with said imaging means;

at least one array of mutually spaced input elements located on, and rotatable together with, said base element, said input elements, when rotating, collectively defining an image surface onto which surface said image is disposed;

means for imparting to said base element a continuous rotary movement wherein by said array of input elements rotating together with said base element is made to scan image points of said image, each scanned image point being converted into a video signal, and a plurality of video signal transmission means leading through converter means via coupling means to at least one output terminal for connection to image recording and/or displaying means, charactrized in that;

said array comprises a plurality of N input elements;

said converter means is a parallel-to-serial converter comprising N input channels M output channels; and said output terminal provides connection for M channels, wherein N>>M.

13. The camera as claimed in claim 12, wherein said camera is a TV-camera comprising:

a housing;

optical imaging means attachable to said housing to provide an optical image of an object;

a base element rotatably mounted in said housing in substantial coaxiality with said optical imaging means;

at least one array of mutually spaced input elements located on, and rotatable together with, said base element, said input elements, when rotating, collectively defining an image surface onto which said imaging means is focusable;

means for imparting to said base element a continuous rotary movement, whereby said array of input elements, rotating together with said base element, is made to scan picture points of said optical image, each scanned picture point being converted into a video signal, and a plurality of video signal transmission means leading via coupling means to at least one output terminal for connection to image-recording and/or displaying means.

14. The TV-camera as claimed in claim 13, wherein the number of said arrays is n, n being an integer divisible by 3, and wherein each group of n/3 arrays is covered by a different one of three light filters of the colors red, green and blue.

15. The TV-camera as claimed in claim 13, further comprising an integral display screen for use as view finder.

16. The TV-camera as claimed in claim 13, further comprising color filter means to modulate the light acting on said input elements.

17. The TV-camera as claimed in claim 13, further comprising light sources producing pure colored light to modify the light acting on said input elements.

18. The camera as claimed in claim 12, wherein said camera is a thermal camera, comprising:

a housing;

optical imaging means attachable to said housing to provide an optical image of an object;

a base element rotatably mounted in said housing in substantial coaxiality with said optical imaging means;

at least one array of mutually spaced input elements located on, and rotatable together with, said base element, said input elements, when rotating collectively defining an image surface onto which said imaging means is focusable;

means for imparting to said base element a continuous rotary movement, whereby said array of input elements, rotating together with said base element, is made to scan picture points of said optical image, each scanned picture point being converted into a video signal, and a plurality of video signal transmission means leading via coupling means to at least one output terminal for connection to image-recording and/or displaying means, wherein said optical imaging means are IR-transmissive and said input elements are IR-sensitive, further comprising means to continuously cool said IR-sensitive input elements.

19. The camera as claimed in claim 12 wherein said camera is an X-ray camera comprising:
a housing;
a base element rotatably mounted inside said housing;
imaging means to provide an X-ray image of an object, rotatably mounted at a distance from said base element and in substantial coaxiality therewith;
a source of X-ray radiation;
at least one array of mutually spaced input elements located on, and rotatable together with, said base element said input elements, when rotating, collectively defining an image surface onto which surface said image is disposed;
means for imparting to said base element a continuous rotary movements, whereby said array of input elements rotating together with said base element is made to scan image points of said image, each scanned image point being converted into a video signal;
means for imparting to said imaging means a continuous rotary movement in synchronism and phase with said input elements when rotating, and
a plurality of video signal transmission means leading via coupling means to at least one output terminal for connection to image recording, storing, and/or displaying means.

20. The X-ray camera as claimed in claim 19, wherein said imaging means is in the form of an X-ray impermeable disk-like mask provided with an array of holes, said array being an affine transformation, with respect to said source of X-rays, of said input-element array.

21. The X-ray camera as claimed in claim 19, further comprising memory means for storing said video signals.

22. The X-ray camera as claimed in claim 20, wherein the array of holes in said disk-like mask comprises two parallel, closely spaced rows of holes.

23. The X-ray camera as claimed in claim 22, wherein at least one of said two parallel rows is covered by filter means.

24. A display unit for displaying images produced by electromagentic radiation, comprising:
a housing;
a base element rotatably mounted in said housing;
at least one input terminal for connecting to a source of video signals;
at least one array of mutually spaced output elements located on, and rotatable together with, said base elements;
a plurality of signal transmission means feeding said signals via coupling means through converter means from said input terminal to said array of output elements;
means for imparting to said base element a continuous rotary movement, whereby said output elements, adapted to convert said video signals into light signals, rotating together with said base element and lighting up in response to said signals, create the impression of a continuous output image; characterized in that:
said array comprises a plurality of N input elements;
said converter means is a serial-to-parallel converter comprising M input channels and N output channels; and
said input terminal provides connection for M channels, wherein $N >> M$.

25. The display unit as claimed in claim 24, further comprising means enabling said display unit to receive video signals from non-camera means.

26. The display unit as claimed in claim 25, wherein said non-camera means are selected from a group including computers and sources of R, $\theta$ signals.

* * * * *